Figure 1:
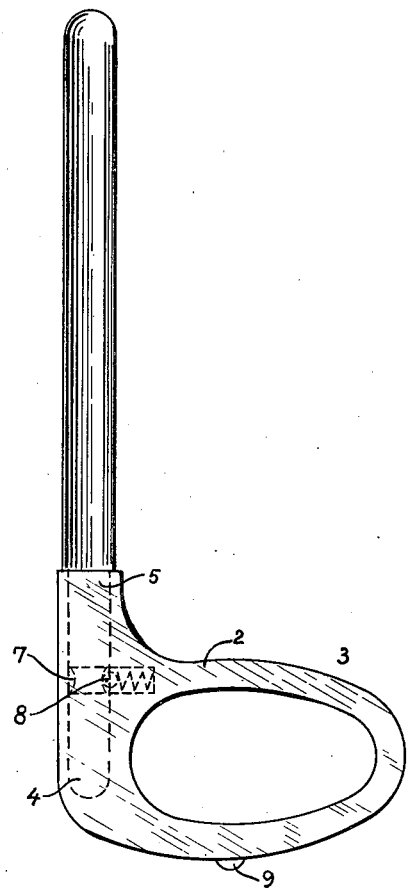

Feb. 1, 1955  H. ARNOLD ET AL  2,701,132
STIRRER
Filed Aug. 23, 1952

INVENTORS:
HENNING ARNOLD AND
WERNER STIG KNUDSEN
BY:

United States Patent Office 2,701,132
Patented Feb. 1, 1955

2,701,132

STIRRER

Henning Arnold and Werner Stig Knudsen,
Copenhagen, Denmark

Application August 23, 1952, Serial No. 306,036

Claims priority, application Denmark August 30, 1951

7 Claims. (Cl. 259—144)

The invention relates to a stirrer which is particularly suited for manually or mechanically mixing a mixture of solid or semi-solid or liquid components.

More particularly the invention relates to a stirring spoon or ladle for household uses, for instance for mixing a dough or a doughlike substance, the components of which have different consistency, but said spoon or ladle may also find other use, for instance industrial use.

The stirring spoon or ladle commonly used for household purposes is rather strenuous to use, since the changing press on the spoon body requires that the handle is kept with a firm grip during the stirring, and in the long run this is very strenuous to the arm muscles. If the handle is not kept in a firm grip, the body of the spoon will turn during the stirring, and the stirring will not be effective. When the stirring is performed with a common spoon it is difficult to keep together the material to be stirred, since it is inclined to be squeezed against and over the sides of the container.

It is an object of the invention to provide a stirrer which is more effective than the commonly used spoon or ladle and easier to use, the work of stirring being considerably reduced. Other objects of the invention will appear from the following, where a more detailed description of the invention and of a preferred embodiment of the new stirrer is given.

The stirring spoon or ladle according to the present invention has a spoon body or vane being freely rotatable around an axis passing outside of the geometrical center of gravity of the spoon body, preferably in the neighbourhood of its rim or border.

If the handle of the stirring spoon is moved in a sufficiently small circle, the spoon body will rotate around an axis parallel to the handle through the center of gravity of the said body. This ensures that the force exerted on the handle in order to carry out the stirring is at all times substantially the same and that the belabouring of the material to be stirred is more effective, on account of the rotation of the spoon body.

In known stirring machines a gearing is commonly used to impart an independent rotating movement to the stirrer besides that imparted to the handle. According to the invention the same is obtained in a much simpler way, since special means for rotating the spoon body is superfluous, the spoon body being freely rotatable.

In order that the belabouring may be more effective, the spoon body may be provided with one or more holes. Whereas the belabouring with an unperforated spoon body is in the way of a kneading, it will be more in the way of a comminuting of the material when the spoon body is perforated, and in the latter case the belabouring will be more effective and the labour smaller.

The connection between spoon body and handle may be made in different ways. In a preferred embodiment of the invention the end of the handle is rotatable in a bore in the spoon body. Preferably the handle is removable. Thereby accumulation of impurities at the place of connection is prevented, and the housing is easily purified when the handle is removed.

To facilitate cleaning of the bore, the spoon body may enclose part only of the periphery of the handle. To prevent the handle from being inadvertently removed from the spoon body, a locking means is used, such as a spring operated ball or an annular spring located in a recess in the handle.

If desired, the spoon body may have a supporting projection serving as center or rotation during the stirring.

An embodiment of the invention is illustrated in the drawing where—

Figure 2:
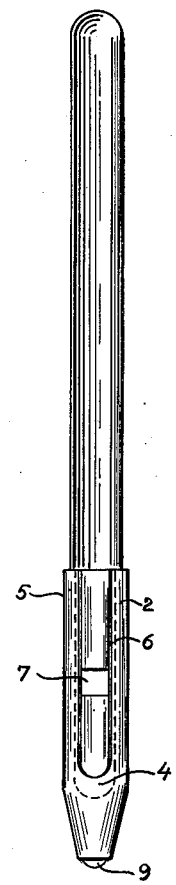
Figure 3:
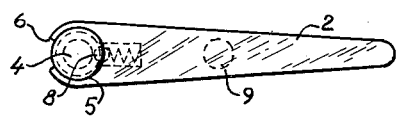

Fig. 1 is a side elevation of the spoon or ladle,
Fig. 2 shows the spoon or ladle seen from the left in Fig. 1 and
Fig. 3 shows a top view of the spoon body.

In the drawings 1 is a handle, 2 is a spoon body rotatable around the handle and 3 is a perforation of the spoon body. Alternatively, more perforations or notches or both may be provided in the rim or border of the spoon body. By means of a pivot 4, the handle 1 is pivoted in a bore 5 in the spoon body. A slot 6 may be provided in the bore 5 to facilitate purifying. To attach the handle securely to the spoon body a recess 7 cooperates with a spring-loaded ball 8. At the bottom of the spoon body a projection 9 is provided, assisting in imparting the desired rotation of said body.

The stirring spoon or ladle may be made from any suitable material, such as wood, metal or plastic.

The above statements must not be considered limiting to the scope of the invention since several modifications will be obvious to anybody skilled in the art. Thus the handle 1 may have different shapes, depending on whether the spoon or ladle is designed for manual work or for use in a stirring machine. The locking means connecting handle and blade may also be changed without departing from the scope of the invention. Likewise the bore 5 may be carried to the bottom of the spoon body in which case the slot 6 may be omitted.

We claim:

1. An agitator implement, comprising, in combination, an elongated handle member; and a substantially vane-shaped agitating member formed with an elongated bore spaced from its center of gravity, said elongated handle member extending into said bore and connected therein to said agitating member for rotation in said bore relative to said agitating member about a first axis spaced from the center of gravity of said agitating member, so that when said handle member is moved in an annular path having its center lying in a second axis parallel to said first axis and passing through the center of gravity of said agitating member, said agitating member is simultaneously turned substantially about said second axis for agitating material in contact therewith.

2. An agitator implement, comprising, in combination, an elongated handle member; and a substantially vane-shaped agitating member formed with an elongated bore at its periphery and spaced from its center of gravity, said elongated handle member extending into said bore and connected therein to said agitating member for rotation in said bore relative to said agitating member about a first axis spaced from the center of gravity of said agitating member, so that when said handle member is moved in an annular path having its center lying in a second axis parallel to said first axis and passing through the center of gravity of said agitating member, said agitating member is simultaneously turned substantially about said second axis for agitating material in contact therewith.

3. An agitator implement, comprising, in combination, an elongated handle member; a substantially vane-shaped agitating member formed with an elongated bore at its periphery and spaced from its center of gravity, said elongated handle member extending into said bore and connected therein to said agitating member for rotation in said bore relative to said agitating member about a first axis spaced from the center of gravity of said agitating member; and locking means associated with said handle member and said agitating member for holding said handle member against axial movement in said bore, whereby when said handle member is moved in an annular path having its center lying in a second axis parallel to said first axis and passing through the center of gravity of said agitating member, said agitating member is simultaneously turned substantially about said second axis for agitating material in contact therewith.

4. An agitator implement, comprising, in combination, an elongated handle member; a substantially vane-shaped agitating member formed with an elongated bore at its periphery and spaced from its center of gravity, said elongated handle member extending into said bore and connected therein to said agitating member for rotation in said bore relative to said agitating member about a first axis spaced from the center of gravity of said agitating member; and resiliently urged locking means associated with said handle member and said agitating member for releasably holding said handle member against axial movement in said bore, whereby when said handle member is moved in an annular path having its center lying in a second axis parallel to said first axis and passing through the center of gravity of said agitating member, said agitating member is simultaneously turned substantially about said second axis for agitating material in contact therewith.

5. An agitator implement, comprising, in combination, an elongated handle member; a substantially vane-shaped agitating member formed with an elongated bore at its periphery and spaced from its center of gravity and opening upwardly from said agitating member, said elongated handle member extending into said bore and connected therein to said agitating member for rotation in said bore relative to said agitating member about a first axis spaced from the center of gravity of said agitating member, so that when said handle member is moved in an annular path having its center lying in a second axis parallel to said first axis and passing through the center of gravity of said agitating member, said agitating member is simultaneously turned substantially about said second axis for agitating material in contact therewith; and a support member projecting downwardly from said agitating member for supporting the latter member during its turning.

6. An agitator implement, comprising, in combination, an elongated handle member; a substantially vane-shaped agitating member formed with an elongated bore at its periphery and spaced from its center of gravity and opening upwardly from said agitating member, said elongated handle member extending into said bore and connected therein to said agitating member for rotation in said bore relative to said agitating member about a first axis spaced from the center of gravity of said agitating member, so that when said handle member is moved in an annular path having its center lying in a second axis parallel to said first axis and passing through the center of gravity of said agitating member, said agitating member is simultaneously turned substantially about said second axis for agitating material in contact therewith; and a support member projecting downwardly from said agitating member substantially along said second axis for supporting the latter member during its turning.

7. An agitator implement, comprising, in combination, an elongated handle member; a substantially vane-shaped agitating member formed with an elongated bore at its periphery and spaced from its center of gravity and opening upwardly from said agitating member, said elongated handle member extending into said bore and connected therein to said agitating member for rotation in said bore relative to said agitating member about a first axis spaced from the center of gravity of said agitating member, so that when said handle member is moved in an annular path having its center lying in a second axis parallel to said first axis and passing through the center of gravity of said agitating member, said agitating member is simultaneously turned substantially about said second axis for agitating material in contact therewith; resiliently urged locking means associated with said handle member and said agitating member for releasably holding said handle member against axial movement in said bore; and a support member projecting downwardly from said agitating member substantially along said second axis for supporting the latter member during its turning.

References Cited in the file of this patent

UNITED STATES PATENTS

| | | |
|---|---|---|
| 94,586 | Fisk | Sept. 7, 1869 |
| 2,526,863 | Gilliam | Oct. 24, 1950 |
| 2,571,264 | Legarra | Oct. 16, 1951 |

FOREIGN PATENTS

| | | |
|---|---|---|
| 722,117 | Germany | July 1, 1942 |